(No Model.)

J. B. TRAZY.
APPARATUS FOR SULPHURING PLANTS.

No. 290,145. Patented Dec. 11, 1883.

Witnesses
N. E. Poulter,
G. B. Towles.

Inventor
Jean B. Trazy
pr Henry Orth
his att'y

UNITED STATES PATENT OFFICE.

JEAN BAPTISTE TRAZY, OF GRENOBLE, FRANCE.

APPARATUS FOR SULPHURING PLANTS.

SPECIFICATION forming part of Letters Patent No. 290,145, dated December 11, 1883.

Application filed May 23, 1883. (No model.) Patented in France February 11, 1882, No. 147,314.

*To all whom it may concern:*

Be it known that I, JEAN BAPTISTE TRAZY, a citizen of the French Republic, residing at Grenoble, in the French Republic, have invented certain new and useful Improvements in Insecticide-Blowers, (for which I have obtained Letters Patent in France under date of February 11, 1882, No. 147,314;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to provide a ready and convenient apparatus for sulphuring vines and other plants—that is to say, for distributing sulphur or other pulverulent insecticide either upon the vines or plants, or injecting the same upon the roots of such.

Figure 1:
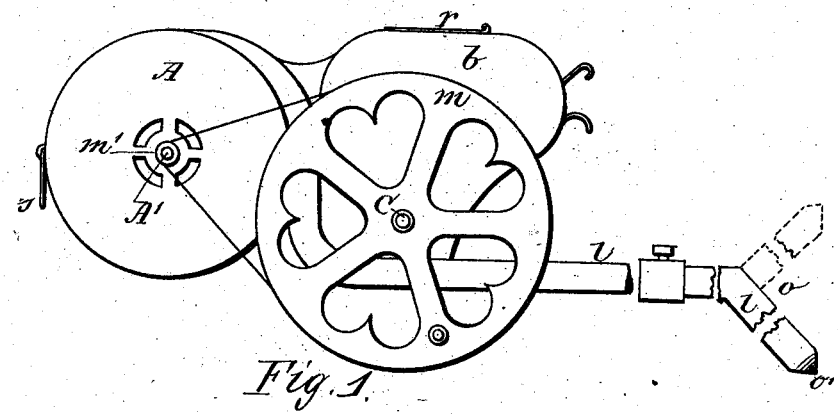
Figure 2:
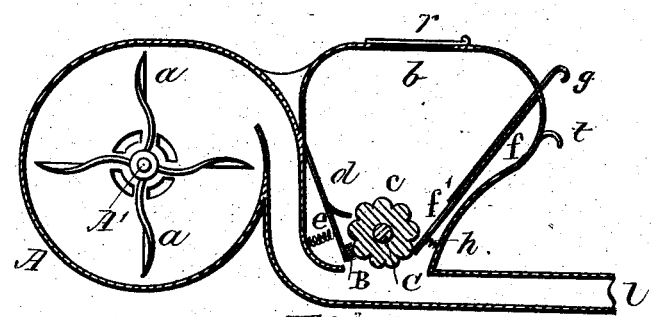
Figure 3:
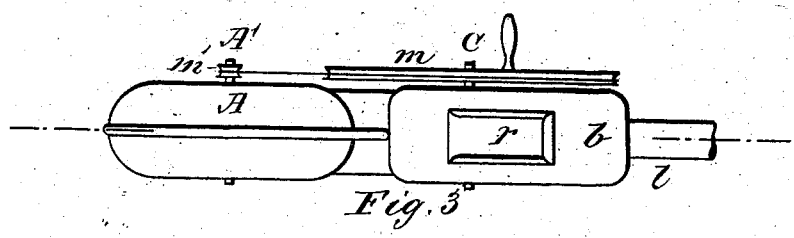
Figure 4:
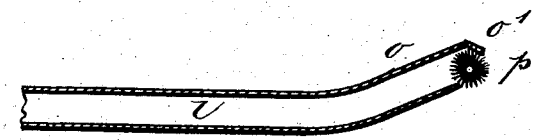

In the accompanying drawings, Figure 1 is a side elevation, Fig. 2 a vertical longitudinal section, Fig. 3 a top plan view, and Fig. 4 a detail view, of a portable apparatus for distributing sulphur or other pulverulent insecticide upon plants or their roots.

Like letters of reference indicate like parts wherever such may occur.

A is a blower-casing, upon a shaft, A', of which is mounted a blower or fan-blades, $a$, of any suitable construction, the shaft A' having its bearings in the opposite sides of said casing.

$b$ is a reservoir, into which sulphur or other insecticide in a pulverulent form is introduced through the sliding gate or door $r$. Within the reservoir is an inclined partition, $d$, to the lower edge of which is attached a brush, B, and on the opposite side thereof is a second inclined partition, $f$, provided with an aperture, $f'$, through which the sulphur or other insecticide passes into the delivery-pipe $l$, that is connected with the blower-casing. The amount of feed is regulated by a slide, $g$, whereby the said opening may be contracted or enlarged, as desired. At the point where the two partitions are closest together—that is to say, at the bottom of the hopper formed by the said partitions $d$ and $f$—is mounted a corrugated crushing-roll, $c$, that serves to crush any lumps that may be contained in the sulphur or other insecticide, and prevents its passage into the ejecting-pipe $l$. The roll rotates in contact with the cleaner-brush B, that strips the roll of the material adhering thereto. The partitions $d$ and $f$ are held in yielding contact with the roll $c$ by means of springs $e\ h$, respectively, as shown in Fig. 2, so that the partitions may yield and allow any hard substance to pass between the roll and said partitions, and also to hold the brush in contact with the roll. The delivery or ejector pipe $l$ is provided with a bent extension, $o$, in the mouth of which is mounted a brush, $p$, Figs. 1 and 4, which, when the apparatus is in operation, scatters the powder as it is ejected by the blower.

$t$ is a loop, by means of which the apparatus is or may be suspended from the waist-belt of the operator, instead of which any other suitable fastening device may be used—such as a hook or buckle or other like device—and $t'$ is a curved finger-piece, whereby the front of the apparatus is held and direction given to the ejected powder, the apparatus, when suspended from the waist-belt or other supporting belt or strap, being held by the left hand, and mechanism set in operation by the right hand, or vice versa, if desired.

The blower, crushing-roll, and distributing-brush $p$ are operated as follows: Upon one end of the shaft C of the roller $c$ is mounted a fly-wheel, $m$, which is belted to a pulley, $m'$, on the blower-shaft. The shaft of brush $p$ is loosely mounted in its bearings, and the brush is rotated by the air-blast. The upper edge of the outer end of the ejector-pipe $o$ is bent downward, as shown at $o'$, Figs. 1 and 4, to give a downward direction to the ejected powder.

In the construction of the apparatus, any suitable material may be employed. One of the objects of this invention is, however, to make the apparatus as light as possible, and to this end I prefer to construct the casing, the reservoir and its partitions, and the fan-blades of sheet metal, the crushing-roll of wood, and the driving-pulleys of metal, as light as possible. I do, however, not desire to limit myself to any particular material in the construction of the apparatus. By the described construction I obtain an ejector of great power within a very small compass and of little weight, that will eject a stream of finely-distributed powder and throw it a distance of several meters.

Having thus fully described my invention, what I claim is—

In an insecticide-blower, the combination, with a fan or blower, an ejecting-tube connected therewith, and a reservoir for the insecticide, of the roller *c*, yielding partitions *d f*, and feed-slide *g*, substantially as described, for the purposes specified.

In testimony that I claim the foregoing I have hereunto set my hand this 1st day of April, 1883.

JEAN BAPTISTE TRAZY.

Witnesses:
L. TOUSSAINT,
CAMILLE CHARROPPIER.